Aug. 18, 1970  R. W. PETERS  3,524,600
STATOR WINDING MACHINE
Filed Oct. 18, 1967  3 Sheets-Sheet 1
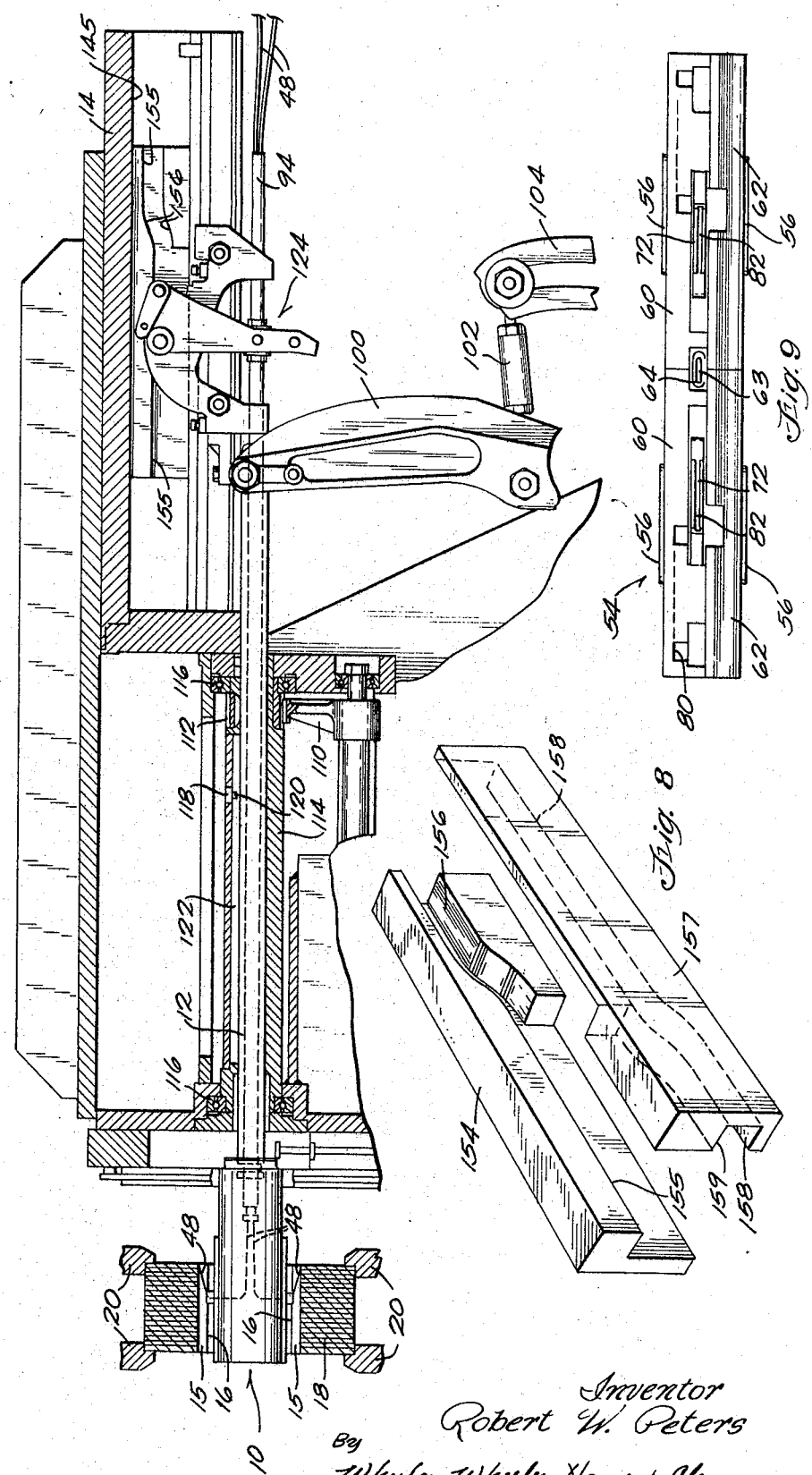
Inventor
Robert W. Peters
By
Wheeler, Wheeler, House & Clemency
Attorneys

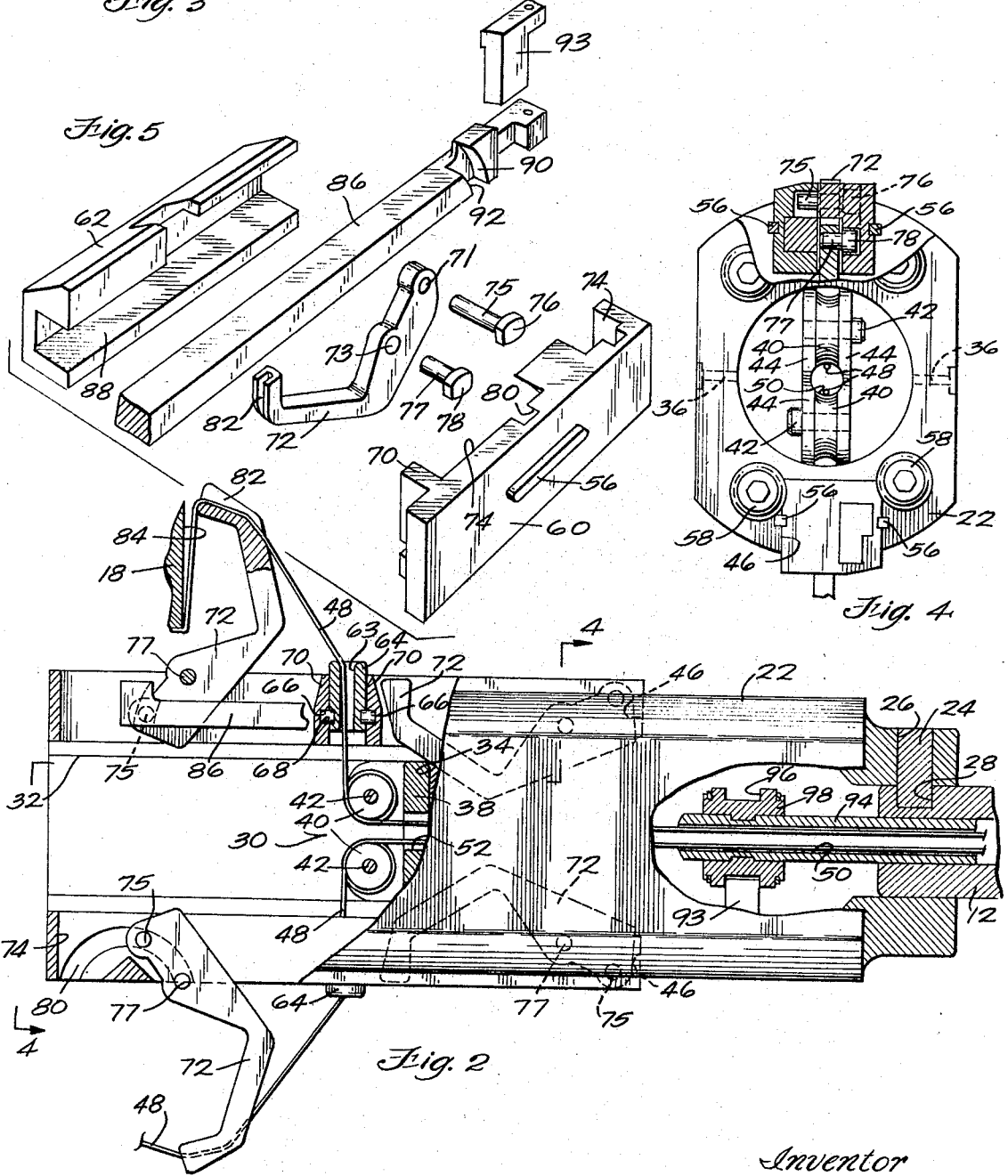

Aug. 18, 1970   R. W. PETERS   3,524,600
STATOR WINDING MACHINE

Filed Oct. 18, 1967   3 Sheets-Sheet 3

Inventor
Robert W. Peters
By
Wheeler, Wheeler, House & Clemency
Attorneys

United States Patent Office 3,524,600
Patented Aug. 18, 1970

---

3,524,600
STATOR WINDING MACHINE
Robert W. Peters, Menomonee Falls, Wis., assignor to Lincoln Tool and Manufacturing Company, Milwaukee, Wis.
Filed Oct. 18, 1967, Ser. No. 676,160
Int. Cl. H02k 15/09
U.S. Cl. 242—1.1
15 Claims

ABSTRACT OF THE DISCLOSURE

Disclosed herein is a winding head for a stator winding machine having a hollow cylindrical housing with one or more needle cartridge assemblies positioned in slots in the outer periphery of the housing. Each needle cartridge assembly has a wire guide needle pivotally mounted between a pair of lift levers which are alternately moveable radially outwardly from the needle. The lift levers are moved by a back drive assembly including a spindle mounted for axial movement within the shuttle on which the winding head is mounted. The back drive assembly is arranged to move the spindle farther than the shuttle at each end of the shuttle stroke.

---

BACKGROUND OF THE INVENTION

Winding heads for stator winding machines of the type contemplated herein are presently available as complete units which are carried at the end of the shuttle of a stator winding machine. A typical example of a stator winding machine may be seen in Pat. No. 3,052,418 and a typical winding head is shown in Pat. No. 3,334,-825. In this two patents the winding head is carried on the end of a shuttle which is reciprocated to move the winding head through the bore of a stator supported by the machine. A wire guide needle in the winding head lays the wire pulled through the shuttle in the slots of the stator. At the end of each stroke of the shuttle, the wire is moved radially outwardly from the bore of the stator by wire guide lift levers that are pivotally mounted in the winding head and the shuttle is rotated to align the needle with another slot in the stator. As the shuttle is rotated to align the needle with the next slot in the stator, the lift lever holds the wire radially outwardly from the bore of the stator to wrap the wire into a loop across the face of the stator.

SUMMARY OF THE INVENTION

Disclosed herein is an improved winding head for a coil winding machine which can be readily observed in operation and quickly and easily repaired or replaced on the front of the machine. This is accomplished by actuating the winding head with a back drive assembly located on the back of the machine. The winding head has one or more independently removeable needle cartridge assemblies mounted in a housing secured to the end of the machine shuttle. Each cartridge asssembly includes a pivotally mounted wire guide needle and a pair of lift levers having wire guides axially aligned with the needle. The lift levers are mounted for translatory and pivotal motion and are alternately actuated near the end of each stroke of the shuttle by a spindle mounted for axial motion within the shuttle and operatively connected to and constituting a part of the back drive assembly. The actuation of the lift levers will move one of the wire guides radially outwardly from the housing near the end of the stroke of the shuttle and will remain in the radially outward position while the shuttle is rotated to align the needle with another slot in the stator.

This type of winding head provides for a symmetrical coil shape with less wear and stress on the wire due to the translatory and pivotal motion of the lift levers as they are moved in and out of the assembly. Each needle cartridge assembly can be quickly and easily removed from the housing and replaced by another cartridge assembly.

Other objects and advantages will become apparent from the following detailed description when read in connection with the accompanying drawings in which:

FIG. 1 is a side view partly in section of the winding head and back drive in a stator winding machine.

FIG. 2 is a side view partly in section of the winding head.

FIG. 3 is a view of a needle cartridge assembly.

FIG. 4 is an end view taken on line 4—4 of FIG. 2.

FIG. 5 is an exploded view of one half of the needle cartridge assembly.

FIG. 8 is a perspective view of the back drive cam blocks.

FIG. 9 is a top view of the needle cartridge assembly.

Figure 6:
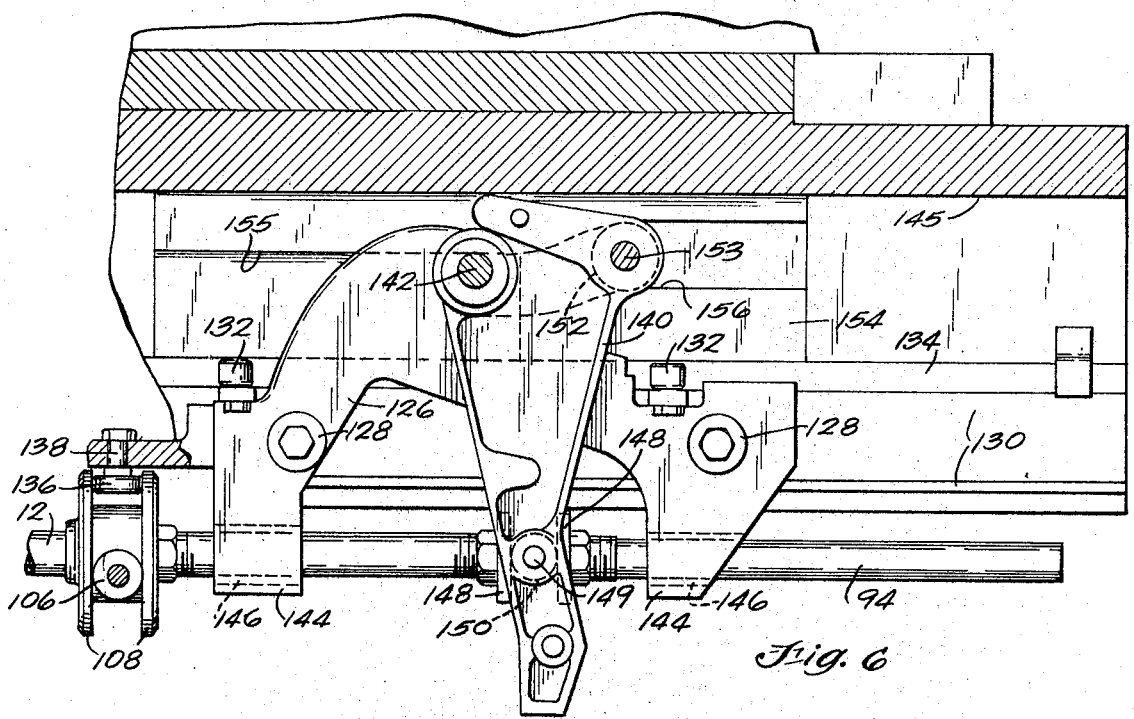
FIG. 6 is an enlarged view of the back drive.

Prior to describing the winding head and the back drive assembly, reference should be made to Pat. No. 3,052,418, cited above. In that patent a hollow shuttle is used to reciprocally move a winding head through the bore of a stator. A needle in the winding head lays the wire that is pulled through the shuttle in the slots of the stator. The shuttle is rotated at the end of each stroke to align the wire guide needle in the winding head with another slot in the stator. During said rotation of the shuttle, the wire is held radially outwardly from the bore of the stator and is wrapped in an arcuate loop across the face of the stator. The same basic reciprocal and oscillating drive system for the shuttle described in Pat. No. 3,052,418 can also be used to reciprocate and oscillate the shuttle of the present invention. An adjustable span mechanism as shown in my copending application Ser. No. 687,674, may also be used with the shuttle of the present application.

DESCRIPTION OF THE PREFERRED EMBODIMENT

As seen in the drawings, a stator 18 is supported by holding clamps 20 on the front of a frame 14 for a coil winding machine with the bore 16 of the stator axially aligned with a hollow shuttle 12 which is mounted for reciprocal and oscillatory motion in the frame 14. A winding head 10 carried on the end of the shuttle 12 will be moved through the bore 16 of the stator by the motion of the shuttle and will lay wire 48, pulled through the hollow shuttle, in the slots 15 of the stator.

The winding head includes a hollow cylindrical housing 22 (FIG. 2) secured to the shuttle 12 by a lock cap 24 inserted into a slot 26 in the housing and seated in a slot 28 in the shuttle. Screws (not shown) are used to hold the cap in position. The wire 48 which is pulled through the shuttle is passed through the bore 32 of the housing 22 and turned radially outward through the eye 63 of a needle 64 supported in a needle cartridge assembly 54 positioned in a slot 46 in the housing. In the drawings, two slots 46 and corresponding needle cartridge assemblies 54 are shown. However, a housing having any prescribed number of slots and needle cartridge assemblies can be used depending on the number of coils that are to be wound at one time.

The wire 48 is turned from an axial to a radial direction over a wire roller guide assembly 30 positioned within the bore 32 of the housing in abutting engagement with a shoulder 34. The wire roller guide assembly includes a circular plate 38 having guide rollers 40 mounted on pins 42 between flanges 44. Set screws 36 are tightened against the edges of the plate 38 to hold the assembly in the housing. A guide roller 40 is required for each needle cartridge assembly, two being shown, and two strands of wire 48 are shown in the bore 52 of the plate 38.

Each needle cartridge assembly 54 (FIGS. 5 and 9) includes a pair of body cams 60 and a pair of body slides 62, a wire guide needle 64, a pair of lift levers 72 and a push rod 86 which constitutes an actuating means for displacing the lift levers. The two body cams 60, as well as the two body slides 62, are identical but are reversed or are mirror images. Each body cam has a curved cam track or groove 80 of identical curvature and a flange 70, and each body slide has a longitudinally extending groove 88. When the body cams and body slides are assembled, they form an elongate assembly that can be positioned in slots 46 in the housing.

The wire guide needle 64 is supported for a small amount of rocking motion on pins 66 seated in apertures 68 flanges 70 of the body cams. The needle is tapered at each edge to guide the needle into the slots of the stator. In the event of any small misalignment of the needle with the slot in the stator, the small amount of pivotal motion of the needle on the pins 66 will allow the needle to move into alignment with the slots 15 of the stator 18.

The lift levers 72 have wire guides 82 on one end and are positioned in recesses 74 in the cam bodies 60 with the wire guide 82 in close proximity to the needle 64. The lift levers are supported on two cam follower pins 75 and 77 that are inserted in apertures 71 and 73 in the lift lever with cam followers 76 and 78 on the ends of the pins 75 and 77 positioned in cam grooves or tracks 80 in the cam bodies. Pin 75 is longer than pin 77 and projects outward from the other side of the lift lever into a groove 88 in the body slide. The curvature of the cam groove or track 80 provides a translatory and pivotal motion for the lift lever when the lift lever is moved toward the needle so that the wire guide 82 moves radially outwardly in substantially a straight line relative to the face 84 of the stator (see FIG. 2). The wire guide 82 will intercept the wire 48 between the face 84 of the stator and the needle 64 as the end of the lift lever moves radially outwardly. The continuous radial motion of the wire guide will seat the wire tightly in the slot in the stator with little or no bending stress on the wire as the wire is pulled from the needle.

The lift levers 72 are pushed back and forth in the body cam by the arcuate contact surfaces 90 and 92 located on the ends of the push rod 86 that is mounted for axial sliding motion in grooves 88 in the body slides 62. The contact surface 90 projects above the push rod 86 in a position to engage the outwardly extending end of pin 75 for cam follower 76. When the push rod is moved to the right (FIGS. 3 and 9), contact surface 90 on the left end of the push rod 86 will engage pin 75 on the left lift lever 72 pushing the lift lever toward the needle. The pin 75 will slide down the contact surface 90 to a position opposite contact surface 92. As the lift lever moves toward the needle, the cam followers 76 and 78 follow the path of the cam groove 80 and move the wire guide 82 radially outwardly in a substantially straight line with respect to the face 84 of the stator. Assuming that the push rod 86 has been moved completely to the left in FIGS. 2, 3 and 9 and the motion of the rod reversed, contact surface 92 on the left end of the push rod will engage pin 75 pushing the left lift lever to the right until pin 75 clears the top of contact surface 92. When the push rod 86 reaches this position, both lift levers will be retracted into the assembly. If the motion of the push rod is continued to the left, the contact surface 90 on the right end of the push rod will engage pin 75 on the right lift lever pushing the right lift lever toward the needle 64 with the same motion as described for the left lift lever.

The push rod is actuated near the end of each stroke of the shuttle by a back drive assembly 124 which includes a hollow spindle 94 mounted for axial motion within shuttle 12 and extending into housing 22. Each push rod 86 has an arm 93 extending radially inwardly into mating engagement with a groove 96 in a spindle adapter 98 secured to the end of the spindle. The motion of the push rod will be controlled by the motion of the spindle near the end of each stroke of the shuttle.

Figure 7:
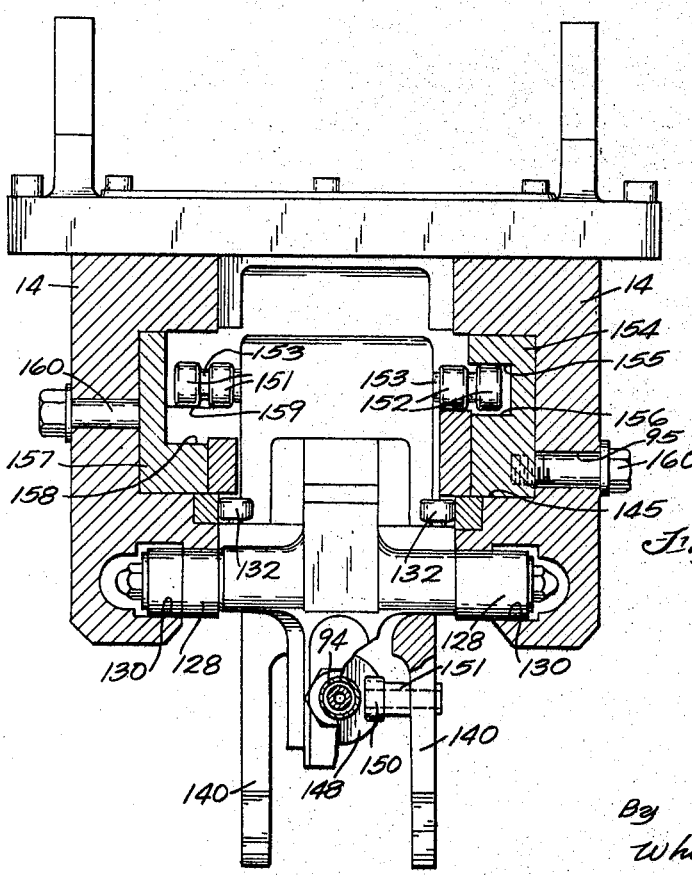
FIG. 7 is an end view of the back drive.

The backdrive assembly for alternately moving the spindle is shown in FIGS. 1 and 6 through 8 of the drawings. As previously indicated in the prior patents, the shuttle 12 is reciprocated by a crank arm 100 connected by a link 102 to a drive arm or bell crank 104. The drive arm 104 is driven in substantially the same manner as disclosed in Pat. No. 3,052,418 to reciprocate crank arm 100. The crank arm 100 is bifurcated at the upper end to straddle shuttle 12 and a pair of spaced rollers 106 are mounted in the end of the crank arm on opposite sides of the shuttle 12. A pair of adjustably positioned axially spaced collars 108 are mounted on the shuttle in a manner such that their adjacent faces engage the opposite sides of both of the rollers 106 to provide a driving connection between the upper end of the crank arm 16 and the shuttle.

The shuttle 12 is rotated at each end of its stroke by means of a gear segment 110 which engages a gear 112 on the end of a tube 114 mounted in roller bearings 116. A roller 118 is mounted to rotate on a pin 120 on the shuttle and extends into a slot 122 in the tube 114. The roller 118 and pin 120 serve as a driving connection between the tube 114 and the shuttle 12. Oscillation of the shuttle is accomplished in substantially the same manner as disclosed in Pat. No. 3,052,418.

The back drive assembly includes a carriage 126 (FIG. 6) having a pair of rollers 128 on each side of the carriage positioned to roll in grooves or tracks 130 on the end of the frame 14. Vertical rollers 132 on the sides of the carriage engage roller plates 134 on the frame 14 to stabilize the motion of the carriage. A drive roller 136 is secured to a pin 138 on the front of the carriage and is positioned between the collars 108 on the shuttle so that the carriage follows the motion of the shuttle. A bell crank 140 is pivotally mounted on a pin 142 on the carriage 126 and extends downward to straddle the rearwardly projecting end of the spindle 94 between the legs 144 of the carriage. The end of the spindle is carried in bearings 146 in the legs 144 of the carriage and is drivingly connected to the bell crank 104 by a pair of collars 148 mounted on the spindle which engage rollers 150 mounted on pins 149 on the bell crank. The bell crank 104 is pivoted either clockwise or counterclockwise, FIG. 6, near the end of each stroke of the shuttle to move the spindle 94 farther than the shuttle. This motion of the spindle will actuate one of the lift levers as the needle 64 in the winding head emerges from the bore of the stator. Cam rollers 151 and 152 are mounted on pins 153 on opposite sides of the bell crank and extend outwardly into cam blocks 154 and 157 adjustably mounted in grooves 145 in the frame 14. Cam roller 152 is positioned to engage the cam surfaces 155 and 156 in the cam block 154 and the cam roller 151 is positioned to engage the cam surfaces 158 and 159 in the cam block 157.

When the shuttle 12 is moved to the right (FIGS. 1 and 6 through 8), the cam rollers 151 will follow the cam surface 158 on the cam block 157 holding the bell crank stationary with respect to the carriage 126 and moving the spindle with the shuttle. As the carriage approaches the end of the frame 14, the cam roller 152 on the other side of the bell crank will roll up on the cam surface 156 in the cam block 154 pivoting the bell crank counter-clockwise and pulling the spindle 94 through the shuttle. When the motion of the shuttle reverses and the carriage is moved to the left, the cam roller 152 will follow the cam surface 155 on the cam block 154 pivoting the bell crank clockwise to its original position and returning the spindle to a neutral or center position. The spindle will move with the shuttle until the cam roller 151 engages and rolls down the cam surface 159 in the cam block 157 pivoting the bell crank clockwise and pushing the spindle through the shuttle as the shuttle nears the end of its stroke.

When the motion of the shuttle again reverses, the cam roller 151 will again follow the cam surface 158 returning the spindle to the neutral or center position. The cam blocks 154 and 157 are held in position in the groove 145 in the frame 14 by the bolts 160 which extend through the slots 95 in the frame. Each cam block can be independently moved in the frame to vary the time of movement of the spindle relative to the shuttle. This adjustment of the cam blocks 154 and 157 is made to compensate for variations in the length of the bore of the stator.

In setting the machine up for operation, a winding head housing 10 is selected for the type of stator to be wound and is secured to the end of the shuttle 12 by securing the lock cap 24 in position. Needle cartridge assemblies 54 are inserted into the slots 46 in the housing and are secured by screws 58. The push rod arm 93 should be aligned in the groove 96 in the spindle adaptor 98. The wire 48 is pulled through the bore 50 of the spindle 94, the bore 52 in the wire roller guide 30, around the rollers 40 and upward through the eye 63 in the needles 64. The winding head is then ready for operation. A stator 18 is placed in the clamps 20 with the bore of the stator axially aligned with the winding head. The cam blocks 154 and 157 are set to start the additional motion of the spindle as the needle emerges from the bore 16 of the stator.

Although only one embodiment of the invention has been shown and described, it should be apparent that various changes and modifications can be made in the invention without departing from the scope of the appended claims.

What is claimed is:

1. In a coil winding machine having a frame, a shuttle mounted on said frame for reciprocal motion toward and away from the bore of a stator supported in the machine, the combination of a winding head comprising a housing secured to the shuttle, and a needle cartridge assembly removably mounted in said housing, said assembly including a wire guide needle, a pair of lift levers axially aligned with said needle, and actuating means for alternately moving one or the other of said lift levers, and drive means carried by said shuttle and operatively connected to said actuating means to move said actuating means farther than the shuttle near the end of each stroke of the shuttle.

2. In a coil winding machine according to claim 1 wherein said assembly includes a pair of body cams having curved cam tracks, and each of said lift levers includes a pair of cam followers positioned in said tracks.

3. A coil winding machine according to claim 2 including means pivotally supporting said wire guide needle on said housing.

4. In a coil winding machine according to claim 2 wherein said actuating means comprises a push rod mounted for axial motion in said assembly, said push rod having an upstanding contact surface at each end to engage said life levers.

5. In a coil winding machine according to claim 1 wherein said drive means includes a spindle mounted for axial motion in the shuttle.

6. In a coil winding machine according to claim 5 wherein said drive means includes a carriage connected to move with said shuttle, a bell crank pivotally mounted on said shuttle and operatively connected to said spindle, and cam means connected to pivot said bell crank near one end of the stroke of the shuttle.

7. In a coil winding machine according to claim 6 wherein said cam means includes two cam blocks, one of said blocks having a cam to pivot one bell crank near the end of the stroke of the shuttle and the other of said blocks having a cam to pivot the bell crank at the other end of the stroke of the shuttle.

8. A coil winding machine according to claim 7 including means for adjustably mounting said cam blocks on said frame.

9. A winding head for aligning wire in the slots of a stator in a coil winding machine having a shuttle mounted for reciprocal motion toward and away from the bore of the stator, said winding head comprising a hollow cylindrical housing secured to the shuttle, and a needle cartridge assembly secured to said housing, said assembly including, a pair of body cams each having curved cam tracks, a wire guide needle supported between said body cam, separate lift levers positioned on each side of said needle, and respectively including cam followers positioned in said cam tracks, and a push rod having an arcuate contact surface at each end, said contact surfaces being aligned to engage said lift levers on movement of said push rod, and a back drive means including a spindle mounted for axial motion within said shuttle and operatively connected to said push rod for moving said push rod as the shuttle approaches the end of its stroke.

10. A winding head according to claim 9 including means for pivotally mounting said wire guide needle on said housing.

11. A winding head according to claim 10 wherein said back drive means also includes a carriage operatively connected to said shuttle, a bell crank pivotally mounted on said carriage and operatively connected to said spindle, a cam follower mounted on each side of said bell crank, and a cam positioned on each side of said bell crank to operatively engage the corresponding cam follower.

12. In a coil winding machine according to claim 11 wherein one of said cams pivots the bell crank near one end of the stroke of the shuttle and the other cam pivots the bell crank near the other end of the stroke of the shuttle, said cams being adjustable to vary the time of pivotal motion of said bell crank.

13. A winding head for a stator winding machine comprising a hollow body having a number of longitudinal slots in its outer periphery, and a removable needle cartridge assembly positioned in each of said slots, each cartridge assembly including a wire guide needle, a pair of lift levers, means mounting said lift levers for translatory and pivotal motion on each side of said needle, and a push rod mounted for reciprocal motion in each of said assemblies to actuate the lift levers, whereby movement of said push rod in one direction will move one of said lift levers and movement of said push rod in the other direction will move the other of said lift levers.

14. The combination in a coil winding machine of a frame, a shuttle mounted on said frame for reciprocal motion toward and away from the bore of a stator supported by the frame, a housing secured to the shuttle, a pair of lift levers movably mounted on said housing, actuating means for moving said lift levers in response to movement of said actuating means, said actuating means being mounted on said housing for movement relative to said housing and to said frame and to said lift levers, and drive means carried, at least in part, by said shuttle and operatively connected to said actuating means for moving said actuating means with respect to said shuttle when said shuttle is near one end of the shuttle stroke.

15. A winding head for a stator winding machine comprising a hollow body having a slot in the outer periphery thereof, a wire lift lever adapted to contact the wire, means mounting said lift lever in said slot for translatory and pivotal motion relative to said slot, and a push rod mounted for reciprocal motion in said slot and operably connected to said lift lever to effect lift lever motion in response to push rod motion.

References Cited

UNITED STATES PATENTS

| | | | |
|---|---|---|---|
| 1,612,026 | 12/1926 | Jannell | 242—1.1 |
| 2,304,520 | 12/1942 | Wirtz et al. | 242—1.1 |
| 3,052,418 | 9/1962 | Gorski et al. | 242—1.1 |
| 3,226,046 | 12/1965 | Droll et al. | 242—1.1 |
| 3,323,734 | 6/1967 | Peters | 242—1.1 |
| 3,334,825 | 8/1967 | Friedrich | 242—1.1 |

OTHER REFERENCES

German printed application No. 1,024,157, February 1958, Wazula et al.

BILLY S. TAYLOR, Primary Examiner

PO-1050
(5/69)

UNITED STATES PATENT OFFICE
CERTIFICATE OF CORRECTION

Patent No. 3,524,600                    Dated August 18, 1970

Inventor(s)    Robert W. Peters

It is certified that error appears in the above-identified patent and that said Letters Patent are hereby corrected as shown below:

Column 3, Line 37, "in" should be inserted before the word flanges

Column 4, Line 50, "124" should be inserted before the word includes

Column 6, Line 5, "life" should read ------lift--------------

SIGNED AND
SEALED
NOV 24 1970

(SEAL)
Attest:

Edward M. Fletcher, Jr.
Attesting Officer

WILLIAM E. SCHUYLER, JR.
Commissioner of Patents